United States Patent [19]

Lake et al.

[11] 4,295,117
[45] Oct. 13, 1981

[54] PRESSURE SENSOR ASSEMBLY

[75] Inventors: Donald E. Lake; John M. Hart, Jr., both of Kokomo, Ind.

[73] Assignee: General Motors Corporation, Detroit, Mich.

[21] Appl. No.: 186,238

[22] Filed: Sep. 11, 1980

[51] Int. Cl.³ .............................................. G01L 1/22
[52] U.S. Cl. ........................................ 338/4; 73/721; 73/727
[58] Field of Search ....................................... 338/2-5, 338/36, 42; 73/720, 721, 726, 727; 357/26

[56] References Cited

U.S. PATENT DOCUMENTS

| | | | |
|---|---|---|---|
| 3,697,917 | 10/1972 | Orth et al. | 338/2 |
| 4,019,388 | 4/1977 | Hall et al. | 73/398 AR |
| 4,040,297 | 8/1977 | Karsmakers et al. | 338/4 |
| 4,127,840 | 11/1978 | House | 338/4 |

Primary Examiner—C. L. Albritton
Attorney, Agent, or Firm—Warren D. Hill

[57] ABSTRACT

A pressure sensor element comprising a silicon chip having a diaphragm formed therein with piezoresistive strain responsive resistors is mounted in a housing of molded polyester material having a much different temperature coefficient of expansion than the chip. The chip is protected from thermally induced and other stresses by a mounting arrangement comprising a glass base secured to the housing by a soft adhesive which largely prevents stress being transmitted from the housing to the base, wherein the base has a short pedestal on which a glass die is mounted which, in turn, supports the silicon chip. The short pedestal adds localized rigidity to the base so that any stresses in the base are taken up outside the region of the pedestal. One face of the glass die is bonded to the base by a relatively soft epoxy to further inhibit stress transmission and the silicon chip is securely bonded to the opposite face of the die. Contacts on the silicon chip are wire bonded to conductors which are insert molded in the housing.

3 Claims, 4 Drawing Figures

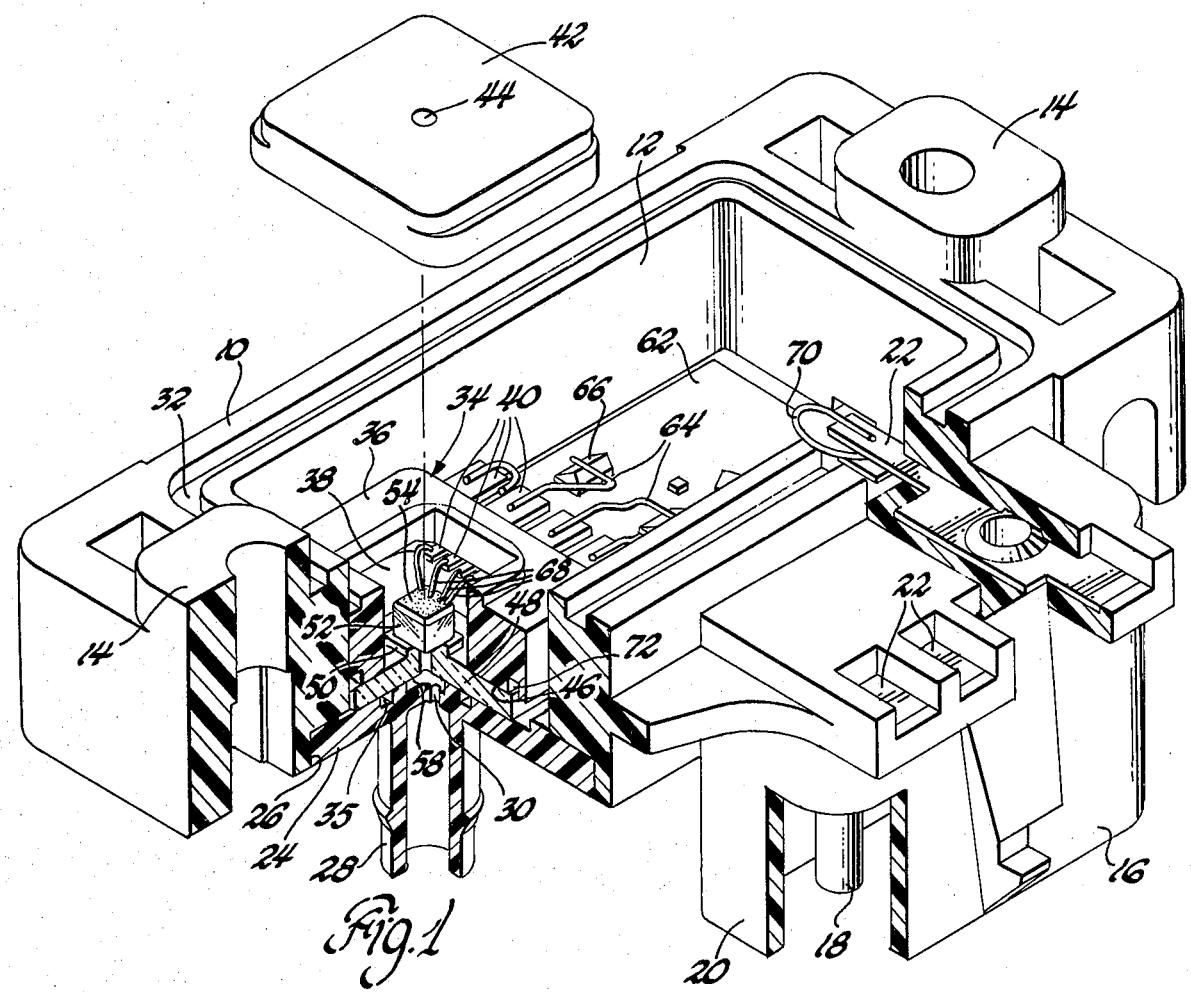

PRESSURE SENSOR ASSEMBLY

This invention relates to a pressure sensor assembly and more particularly to such an assembly for isolating a pressure sensor element from stresses arising in other parts of the assembly.

In order to manufacture large volumes of accurate pressure transducers economically the technology has been developed which uses a semi-conductor chip containing a diaphragm and piezoresistive strain sensors on the diaphragm which are connected in a circuit to measure the diaphragm deflection due to pressure differential across the diaphragm. While such devices have become well known in the art, it has, until this invention, remained a problem to inexpensively package the sensor chip by methods suitable for high production rates and at the same time protect the chip from stresses which would cause diaphragm deflection and false pressure readings.

It is therefore a general object of this invention to provide a sensor assembly for housing a pressure sensor chip and isolating the chip from external stresses, particularly those thermally induced in other parts of the assembly. It is the further object of this invention to provide such an assembly utilizing commonly available inexpensive materials.

The invention is carried out by providing a housing of molded polymer material having a central cavity and an opening covered by a glass base secured to the housing by a soft adhesive which tends to inhibit stress transfer from the housing to the glass base. A central upstanding pedestal on the base provides extra rigidity to further inhibit stresses at that point, a glass die is mounted on that pedestal and the pressure sensor chip is secured to the glass die; the semiconductor chip and the glass parts having substantially the same temperature coefficient of expansion which is much different from that of the polymer housing.

The above and other advantages will be made more apparent in the following specification taken in conjunction with the accompanying drawings wherein like reference numerals refer to like parts and wherein:

FIG. 1 is a partially cross-sectional isometric view of a pressure transducer package containing a pressure sensor assembly according to the invention;

FIG. 2 is a cross-sectional elevational view of the pressure sensor assembly of FIG. 1;

FIG. 3 is a top view of the base plate of the assembly of FIG. 2; and

FIG. 4 is a cross-sectional elevational view of another embodiment of the pressure sensor assembly according to the invention.

Referring to FIG. 1, a pressure transducer package includes an outer body 10 defining a generally rectangular cavity 12 and having at each end lug portions 14 to allow the fastening of the package to a support, not shown. At one side of the body a connector assembly 16 integrally molded with the body 10 includes downwardly projecting terminal pins 18 surrounded by a protective wall 20, and terminal strips 22 which are electrically connected to the terminal pins 18 and are insert molded into the body 10 to extend into the cavity 12. The bottom of the transducer package is closed by a rectangular plate 24 which seats within a recess 26 along the lower periphery of the cavity 12. A downwardly extending tube 28 is integrally molded in the plate 24 near one end thereof and a small hole 30 in the plate 24 communicates with the tube 28 and is located eccentrically thereof. The body 10 and plate 24 are formed of an inexpensive polymer such as a polyester which is economically molded into the desired shapes. A top cover for the transducer package, not shown, would be molded of a similar material and mates with a groove 32 on the upper surface of the body surrounding the cavity 12. The top cover and the plate 24 are bonded to the body 10 by an adhesive such as room temperature vulcanizable material (RTV). Within the cavity 12, the plate 24 supports a pressure sensor assembly 34 directly above tube 28. An annular groove 35 is formed in the upper surface of the plate 24 concentric with the tube 28. The assembly 34 is secured to the upper surface of the plate by RTV adhesive applied outside the groove 35. The groove 35 serves as a dam to prevent adhesive flow to the region of the opening 30.

The assembly 34, as shown in FIGS. 1 and 2, includes a housing 36 having a central cavity 38 and four terminal blades 40 insert molded therein, the ends of the blades 40 extending outside the housing 36 being large and widely spaced whereas the portions extending into the cavity 38 are small and closely spaced. The housing 36 is open at both the lower and upper ends. A cover 42 having a vent 44 is provided to close the upper opening and is secured thereto by an RTV adhesive. The lower opening of the housing is surrounded by a flat end surface 46. A glass base 48 is secured to the flat surface 46 by a soft adhesive. A groove 72 in the bottom of the housing 36 surrounding the flat surface 46 and coinciding with the edge of the base 48 holds a generous amount of RTV adhesive to assure a good seal between the base and the housing. Locating pins 60 depending from each corner of the housing 36 mate with locating recesses, not shown, in the plate 24.

A ceramic circuit board 62 is located in the cavity 12 and is mounted to the plate 24 alongside the sensor assembly 34 and secured by an RTV adhesive. Wires 64 welded to the terminals 40 and bonding pads 66 on the circuit board electrically connect the circuit board with the sensor assembly. Other wire conductors 70 interconnect the terminal blades 22 with other bonding pads on the circuit board 62 to effect the external connection to the transducer package.

As shown in FIGS. 2 and 3, the base 48 is a generally rectangular plate having the corners removed to clear the locating pins 60. A short pedestal 50 integrally formed in the center of the upper surface 51 of the plate is square to accommodate a cubic glass die 52 mounted thereon and secured by a soft epoxy. The pedestal 50 adds rigidity to the central portion of the base so that any mechanical stresses induced in the base or applied to the base by the housing 36 or the plate 24 will be minimized at the pedestal and thus will be taken up in the remainder of the base which has lower rigidity than the pedestal area. Further, the pedestal meets the surface 51 of the base at a sharp corner so that stresses in the central region of the base will be concentrated at the outer edge of the pedestal and the resulting strain will be localized there rather than in the pedestal. Another advantage of the pedestal is that it facilitates the accurate application of adhesive for bonding the die to the pedestal thereby avoiding a stress transfer path which would arise if some adhesive spread out onto the surface 51 and nullify the effects of the sharp corner.

A silicon chip 54 is mounted atop the die 52 by anodic bonding and has a cavity etched in its lower surface to form a thin diaphragm between the cavity and the upper chip surface. A hole 56 drilled through the die 52 and the base 48 connects the cavity through a passage 58 in the plate 24 to the hole 30 leading to the tube 28. The diaphragm deflects according to the difference in pressure applied to the opposite sides of the diaphragm. The pressures are applied to the cavity through the hole 56 and to the upper chip surface by the vent 44 in the cover. A piezoresistive bridge circuit formed in the top surface of the chip 54 is electrically connected to the inner ends of the leads 40 by fine flexible wire bonds 68. The bridge circuit when connected to a transducer circuit measures the diaphragm deflection and therefore the pressure differential across the diaphragm.

The base 48 is formed of an annealed borosilicate glass formed of pressed glass powder such as Corning 7070 and the die is a borosilicate industrial flat glass such as Corning 7740, both available from Corning Glass Works, Corning, New York. Each glass has substantially the same thermal coefficient of expansion as the silicon chip 54, i.e. $32.5 \times 10^{-7}$/°C. Thus temperature changes which equally affect the chip and the glass parts will not give rise to stresses in the chip. However, the polyester housing 36 has a thermal coefficient of expansion on the order of $50 \times 10^{-6}$/°C. and will be differently affected by such temperature changes. The resulting dimensional changes in the housing relative to the base 48 will be taken up primarily by the soft RTV adhesive connecting the base to the housing as well as in the base itself outside the area of the pedestal and in the soft epoxy between the pedestal 50 and the die 52 so that the chip 54 itself is isolated from the stress. The RTV adhesive is, for example, a two-part silicone elastomer having a Shore A hardness of at least 50 after curing. The soft epoxy is preferably a one component epoxy adhesive having a Shore D hardness between 80 and 85 after curing. The wire bonds 68 by their inherently flexible nature will not transmit significant stress from the terminals 40 to the chip 54.

FIG. 4 shows a second embodiment of the pressure sensor assembly using the same housing 36 and silicon pressure sensor chip 54 but the base 48' and die 52' differ from the corresponding parts of the first embodiment in that they have no hole. Thus, the cavity formed in the underside of the chip 54 is isolated from any pressure source and contains only the reference pressure applied thereto at the time of its manufacture, preferably $5 \times 10^{-3}$ microns Hg. Thus a fixed reference pressure is provided. Then the sensor output depends only on the pressure within the housing 36. The cover 80 affixed to the top of the housing 36 has a vent 82 communicating with the interior of the housing 36 and locating pins 84 at each corner. The surface of the housing 80 between the pins is flat so that the general configuration of the cover 80 is like that of the combined housing 36 and base 48. That is, the sensor package is symmetrical about the plane of the conductors 40. In use the sensor assembly is incorporated in a transducer package like that of FIG. 1 with the package "turned upside down" so that the cover 80 is secured to the plate 24 and the base 48' is at the top of the assembly. In any event the structure of the assembly isolating the chip 54 from the stresses induced in the housing 36 is identical to that previously described.

It will thus be seen that pressure sensor according to this invention provides a sensor of high integrity isolated from the effects of thermal and other stresses arising in the housing or elsewhere and that inexpensive readily manufactured parts are used for the outer housing which is coupled to a high precision silicon pressure sensor chip through a stress isolating structure.

The embodiments of the invention in which an exclusive property or privilege is claimed are defined as follows:

1. In a pressure sensor assembly, means for mounting a pressure sensor element in a housing to isolate the sensor element from stresses occurring in the housing, comprising
   a hollow molded resin housing having an external opening, a flat surface surrounding the opening,
   a glass base secured to the flat surface and covering the opening, the glass base and the housing having different thermal coefficients of expansion and being joined by a layer of soft resilient adhesive which inhibits stress transfer from the housing to the base, the glass base comprising a plate having an integral raised pedestal extending into the said opening whereby any stresses in the base are minimized in the pedestal due to the added rigidity in the region of the pedestal,
   a glass support in the housing secured to the pedestal by a soft epoxy adhesive which inhibits the transfer of stress from the pedestal to the support, and
   a silicon pressure sensor chip rigidly bonded to the glass support at a region spaced from the pedestal, the glass base and the glass support each having approximately the same thermal coefficient of expansion as the silicon chip,
   whereby the cumulative effect of the several stress minimizing features is to isolate the silicon chip from thermal and other stresses induced in the housing or other parts of the assembly.

2. In a pressure sensor assembly, means for mounting a pressure sensor element in a housing to isolate the sensor element from stresses occurring in the housing, comprising
   a hollow molded resin housing having an external opening, a flat surface surrounding the opening,
   a glass base secured around its periphery to the flat surface and covering the opening, the glass base and the housing having different thermal coefficients of expansion and being joined by a layer of soft resilient adhesive which inhibits stress transfer from the housing to the base, the glass base comprising a plate having an integral raised pedestal extending into the said opening, the pedestal meeting the plate surface in a sharp corner whereby any stresses in the base are concentrated in the plate around the pedestal and are minimized in the pedestal due to the sharp corner and the added rigidity in the region of the pedestal,
   a glass support in the housing secured to the pedestal by a soft epoxy adhesive which inhibits the transfer of stress from the pedestal to the support, and
   a silicon pressure sensor chip rigidly bonded to the glass support at a region spaced from the pedestal, the glass base and the glass support each having approximately the same thermal coefficient of expansion as the silicon chip,
   whereby the cumulative effect of the several stress minimizing features is to isolate the silicon chip from thermal and other stresses induced in the housing or other parts of the assembly.

3. In a pressure sensor assembly, means for mounting a pressure sensor element in a housing to isolate the sensor element from stresses occurring in the housing, comprising a hollow molded resin housing having an external opening, a flat surface surrounding the opening, a glass base secured to the flat surface and covering the opening, the glass base and the housing having different thermal coefficients of expansion and being joined by a layer of soft resilient adhesive which inhibits stress transfer from the housing to the base, the glass base comprising a plate having an integral raised pedestal extending into the said opening whereby any stresses in the base are minimized in the pedestal due to the added rigidity in the region of the pedestal, a glass support in the housing secured to the pedestal by a soft epoxy adhesive which inhibits the transfer of stress from the pedestal to the support, a silicon pressure sensor chip rigidly bonded to the glass support at a region spaced from the pedestal, the glass base and the glass support each having approximately the same thermal coefficient of expansion as the silicon chip, a plurality of electrical terminals molded in and extending through the housing and terminating near the sensor chip, and means electrically interconnecting the terminals and the sensor chip comprising fine flexible wires each connected to a terminal and the sensor chip, so that relative movement between the terminals and the chip effects substantially no stress in the chip, whereby the cumulative effect of the several stress minimizing features is to isolate the silicon chip from thermal and other stresses induced in the housing or other parts of the assembly.

* * * * *